INVENTORS.
ROLAND M. ANDERSON
PAUL E. KLEIN
BY

*Christie, Parker & Hale*
ATTORNEYS.

INVENTORS.
ROLAND M. ANDERSON
PAUL E. KLEIN
BY
Christie, Parker & Hale
ATTORNEYS.

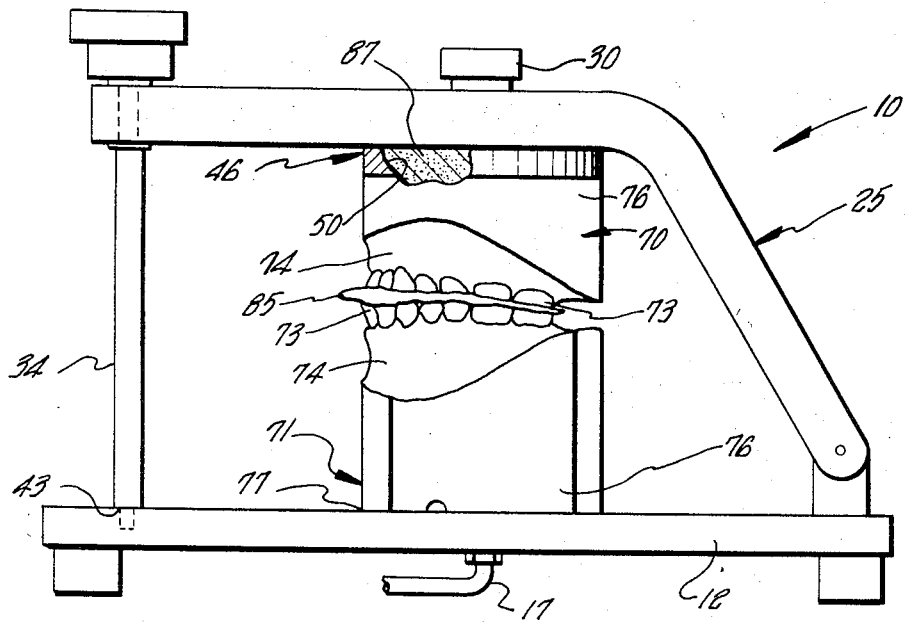
FIG. 7.
FIG. 8.
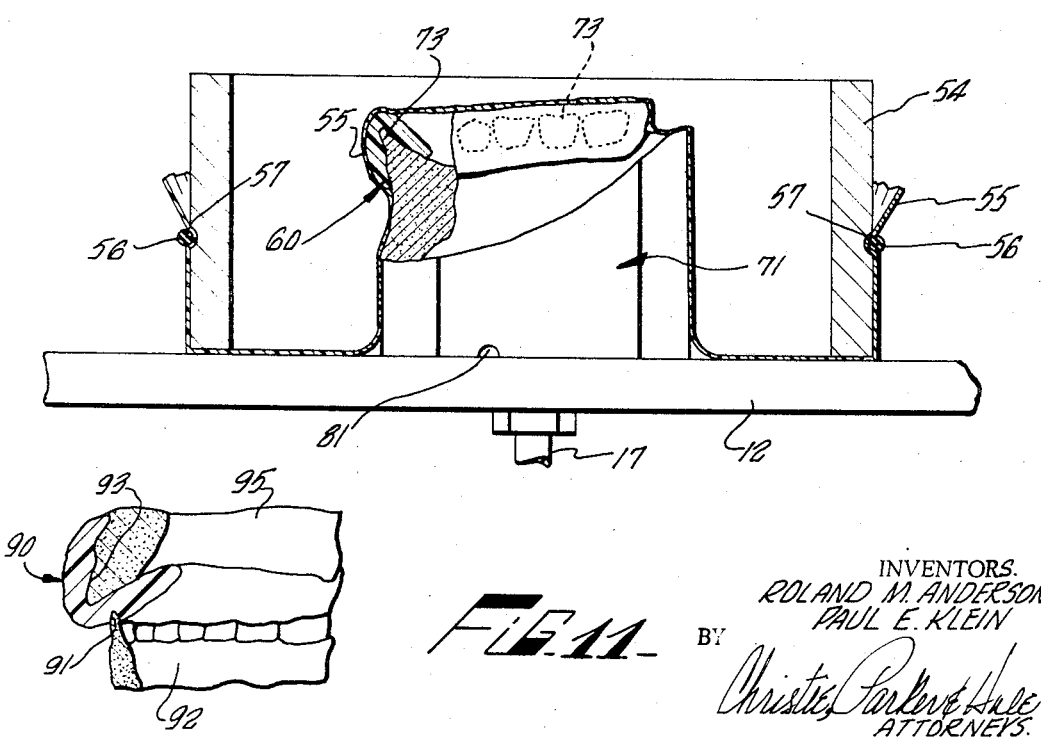
FIG. 11.
INVENTORS.
ROLAND M. ANDERSON
PAUL E. KLEIN
BY
Christie Parker & Hale
ATTORNEYS.

United States Patent Office 3,429,045
Patented Feb. 25, 1969

3,429,045
METHOD AND APPARATUS FOR MAKING DENTAL MOUTHPIECE
Roland M. Anderson, 2770 SW. 107th, Portland, Oreg. 97225, and Paul E. Klein, 928 Lakeshore Road, Lake Oswego, Oreg. 97034
Filed Feb. 1, 1966, Ser. No. 524,134
U.S. Cl. 32—32      7 Claims
Int. Cl. A61c *11/00*

ABSTRACT OF THE DISCLOSURE

An apparatus and method for forming an anatomically contoured dental mouthpiece. A dental articulator has a base for mounting a plaster model of one dental arch, and a model of an opposing dental arch is secured to a hinged bracket secured to the base. A wax bite is used to align the models with respect to each other in the articulator. A vacuum molding means forces a warmed thermoplastic mouthpiece blank over the model secured to the base, and the hinged bracket is subsequently positioned to force the opposing arch model into the blank to form the contoured mouthpiece.

Background of the invention

Figure 1:
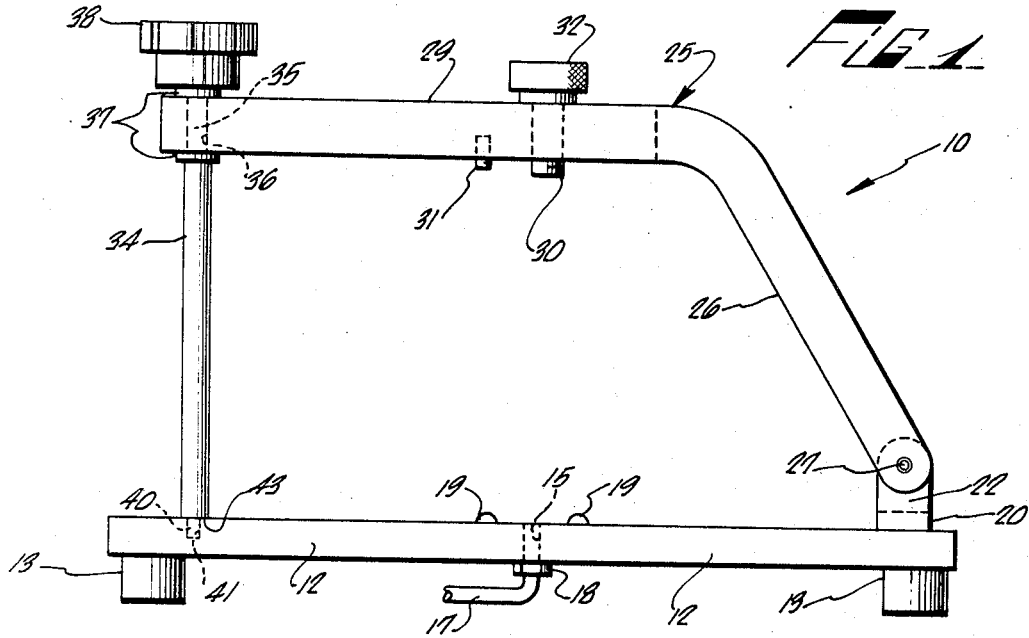

The term "dental mouthpiece" as used herein denotes a removable intra-oral appliance which anatomically conforms to and fits over and against some or all teeth in the dental arches of the wearer. The mouthpiece is generally U-shaped to correspond to the curvature of the dental arches, and typically extends over and receives support from the gum tissue adjoining the teeth in one arch. The mouthpiece includes custom-formed sockets or cavities which receive the teeth in a snug, precise and accurate relationship.

A common application of such appliances is as orthodontic retainers for use in the final stage of an orthodontic treatment program. After malpositioned teeth of the patient have been shifted to a desired orientation, they are prevented from "drifting" away from this orientation by intermittent or continuous use of a retainer. The retainer fits snugly around the teeth, and exerts a gentle restraining force against undesired tooth movement. Use of the retainer is continued until the supporting bone has grown around the repositioned teeth to anchor them in place. A retainer can also be used to exert minor repositioning forces on a slightly malpositioned teeth.

Another application for dental mouthpieces is as mouthguards for athletes and the like to provide a shock-absorbing cushion to avoid concussion and neck injury, and to lessen the likelihood of tooth, lip and gum damage from facial blows. Conventional mouthguards have usually been formed to fit the upper dental arch only, and no provision is made to occlude the teeth of the lower arch into a natural relationship with the upper-arch teeth. That is, the teeth in the lower arch close against a blunt or flat undersurface of such a mouthguard. A more effective, comfortable, and securely retained mouthguard is provided if the appliance is custom molded to fit precisely against and around the wearer's upper teeth, and precisely positioned indentations are provided to receive the occlusal surfaces of the lower teeth, reproducing a natural, at-rest position of the jaws.

Whether used as mouthguards or orthodontic retainers, such mouthpieces are preferably formed to minimize lip and tongue interference so normal speech can be maintained, and should also permit the user to position his jaws in a normal closed-jaw position which is naturally assumed when the jaw muscles are relaxed and at rest.

To achieve these goals, mouthpieces have sometimes in the past been molded in two halves which are then secured together. One half is formed to receive and fit snugly around the teeth and gums in one dental arch (e.g., the maxillary or upper arch), and the second half is formed to receive and fit over the teeth and gums of the other dental arch (e.g., the mandibular or lower arch).

The two-piece mouthpiece presents a time-consuming molding and assembly problem for the dentist, and the forming and assembly of the two halves must be done with great precision to achieve correct fit on the teeth of both dental arches and to permit the user to position his jaws comfortably in a relaxed, closed-jaw orientation. The resulting mouthpiece is therefore expensive, and is also costly to replace if lost by the user. The fabrication of replacement units is a common need with children who frequently misplace orthodontic retainers. This style of mouthpiece is also bulky, and normal jaw movement is prevented as well as speech and free breathing through the mouth.

We have developed methods and apparatus for fabricating an integral, one-piece mouthpiece which overcomes the problems just described. The mouthpiece is molded over a pair of cast plaster models made from impressions taken from the upper and lower dental arches of the patient, and exact anatomical alignment of the tooth-encasing sockets or cavities for both arches is assured. The technique of the invention is fast and straightforward, and may be readily carried out by a technician, freeing the dentist for other work. An original mouthpiece can be exactly reproduced at any time by repeating the molding operation on the plaster models which are typically stored by the dentist to assist in observation of treatment progress. Importantly, the reduction in time and skill required to fabricate the mouthpiece makes possible a reduction in cost to the user.

Briefly stated, the anatomically contoured dental mouthpiece of this invention comprises an integral body of thermoformable plastic. The body is generally U-shaped, and has a concave upper surface formed to fit snugly over the maxillary dental arch of a patient. The concave upper surface includes a lower portion having sockets configured to encase and support teeth in the maxillary arch. A convex lower surface of the body includes sockets configured to receive teeth in a mandibular arch of the patient.

In terms of apparatus for forming the anatomically contoured dental mouthpiece, the invention comprises a dental articulator having a baseplate for mounting a first dental-arch model of a patient, and a bracket secured to the baseplate and adapted to be secured to a second dental-arch model when the first and second models are positioned to reproduce a specific inter-arch relationship of the patient. The bracket is movable toward and away from the first model whereby the models may be separated and subsequently moved together to reproduce the inter-arch relationship.

The apparatus further comprises molding means for forcing the blank into intimate contact with the first model. Preferably, the molding means includes a flexible diaphragm positionable against the baseplate and over the blank and first model, and a vacuum line in communication with a region surrounding the blank and the first model, the region being enclosed by the baseplate and diaphragm. Evacuation of the region through the line draws the diaphragm tightly against the blank and first model, accomplishing the initial forming of the blank.

In terms of a method for forming a blank of thermoplastic material into an anatomically contoured dental mouthpiece, the invention comprises the steps of first aligning a pair of first and second dental-arch models of a patient with a wax bite to reproduce a specific interarch relationship of the patient. The aligned models are then secured in a dental articulator whereby the models may be separated and subsequently realigned without further adjustment. The thermoplastic blank is then warmed to a moldable condition, and then vacuum-formed into intimate contact with the first model. The second model is next forced into the aligned position while the warmed blank is in position on the first model. The blank is allowed to cool, and the models are separated whereby the formed mouthpiece may be removed from the models.

Figure 2:
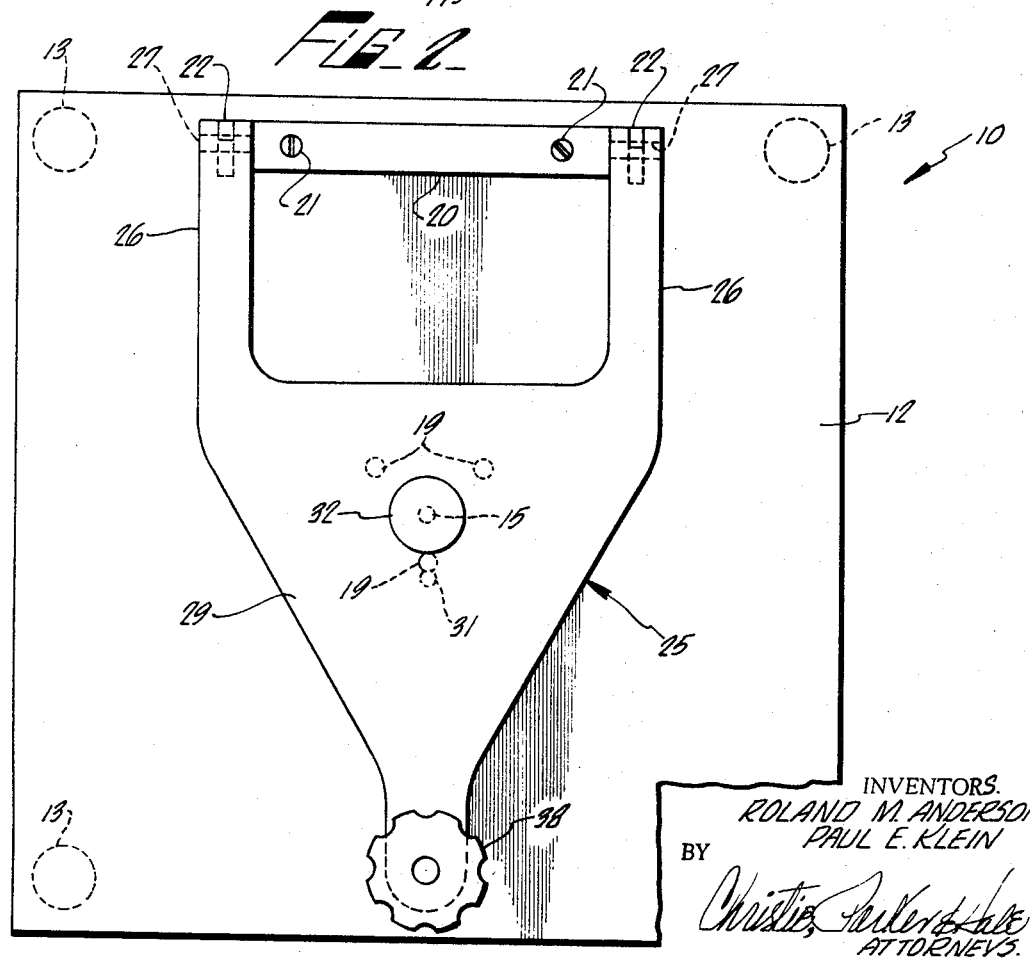
Figure 3:
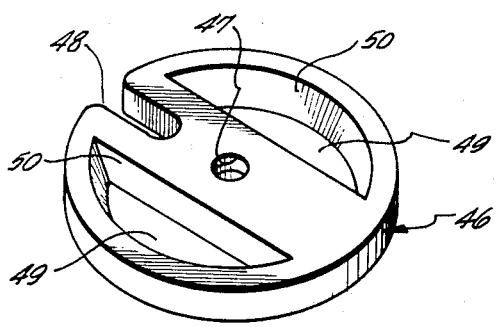
Figure 4:
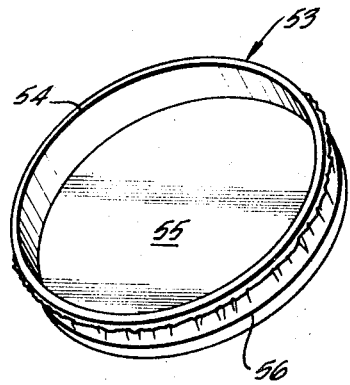
Figure 5:
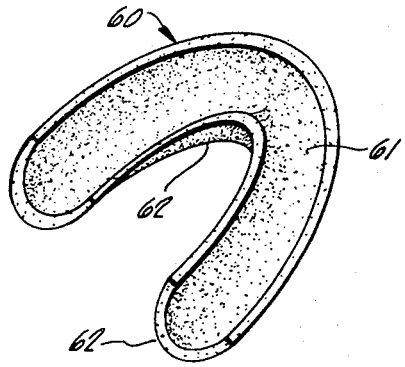
Figure 6:
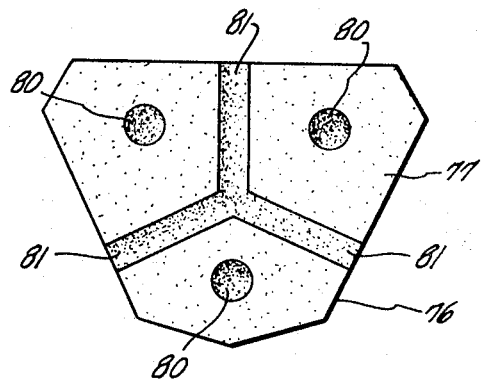
Figure 9:
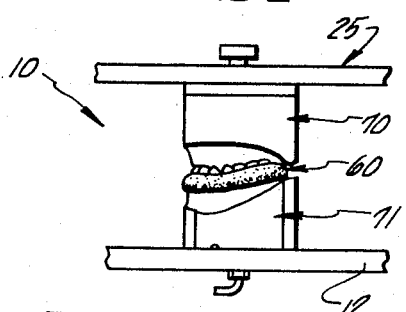
Figure 10:
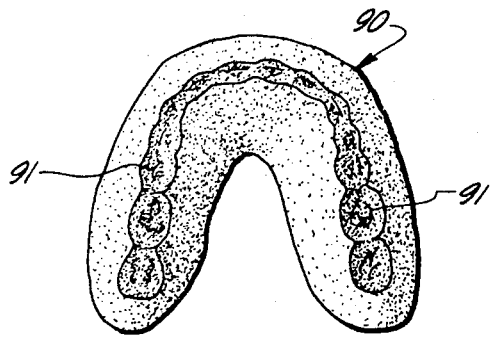

The invention will be described in detail with reference to the attached drawings, in which:

FIG. 1 is an elevation of an articulator assembly;
FIG. 2 is a plan view of the articulator assembly;
FIG. 3 is a perspective view of a mounting plate useful with the articulator;
FIG. 4 is a perspective view of a diaphragm assembly used to vacuum form the mouthpiece;
FIG. 5 is a perspective view of a thermoformable blank used to fabricate a mouthpiece;
FIG. 6 is a view of the undersurface of a dental-arch model;
FIG. 7 is an elevation, partly in cross-section, of a pair of dental-arch models occlusally aligned with a wax bite and mounted in the articulator assembly;
FIG. 8 is an elevation, partly in cross-section, of a portion of the articulator assembly, showing the blank being vacuum formed on one of the dental-arch models;
FIG. 9 is an elevation of a portion of the articulator, showing the molding of the blank on the second dental-arch model;
FIG. 10 is a plan view of a convex side of the finished retainer; and
FIG. 11 is a sagittal section through the mouth of a wearer of the mouthpiece.

Referring to the drawings, FIGS. 1 and 2 show a dental articulator assembly 10 for securely and reproducibly mounting a pair of dental-arch models on which a mouthpiece is to be molded. The articulator assembly includes a baseplate 12 and a mounting foot 13 is secured to each corner of the undersurface of the baseplate. An evacuation hole 15 extends through the baseplate, and a vacuum line 17 in communication with the hole is secured to the baseplate by a conventional fitting 18. Three hemispherical indexing buttons 19 are secured to a top surface of the mounting plate, and are spaced in a triangular pattern around hole 15.

A strap 20 is secured adjacent one edge of the top surface of the baseplate by a pair of screws 21, and the ends of the strap are bent upwardly from the baseplate to form a pair of mounting legs 22. An articulator bracket 25 includes a pair of spaced-apart arms 26 which are slotter to fit over mounting legs 22. A pair of pivot pins 27 extend through the arms and mounting legs, permitting the arms to pivot freely about the axis of the pivot pins which is parallel to the top surface of the baseplate.

Bracket arms 26 extend upwardly from the baseplate and merge into a tapered body portion 29 which is spaced from and extends over the top surface of the baseplate. A threaded clamp screw 30 passes freely through the bracket body, and an index pin 31 is secured to and extends from the undersurface of the bracket body adjacent the clamp screw. A knob 32 is secured to the upper end of the clamp screw.

A spacing rod 34 has a necked-down upper portion 35 which is journaled through a hole 36 in the end of the bracket body away from the bracket arms. A pair of washers 37 are mounted on the necked-down portion on opposite sides of the bracket body, and a knob 38 is secured to the upper end of the necked-down portion.

The lower end of the spacing rod has a necked-down threaded portion 40 for securing the rod in a threaded hole 41 in the baseplate. An annular shoulder 43 is formed at the upper end of threaded portion 40, and the shoulder abuts the upper surface of the baseplate when the rod is threaded into hole 41. The shoulder serves as a positive stop whereby the rod may be reproducibly threaded into the baseplate to a specific depth.

The length of rod 34 is chosen to position the bracket body horizontally above the baseplate when the rod is threaded into the baseplate. Unthreading the spacing rod from the baseplate allows the bracket to be hinged upwardly away from the baseplate around pivot pins 27, providing free access to the upper surface of the baseplate.

Alternatively, rod 34 may simply have a rounded end which abuts the upper surface of the baseplate to reproducibly position the bracket body above the baseplate. The primary purpose of the rod is to provide a repeatable height setting of the bracket body above the baseplate, and this function can be achieved even if the rod is not adapted to be secured to the baseplate.

A circular mounting plate 46 for securing a dental-arch model to the articulator bracket is shown in FIG. 3. The mounting plate includes a central threaded hole 47 therethrough, and a radial indexing notch 48 extends from the periphery of the plate toward the threaded hole. A pair of semi-circular apertures 49 are cut through the plate on either side of the threaded hole, and walls 50 of the apertures are tapered or sloping whereby the apertures decrease in width from the top to the bottom of the mounting plate.

FIG. 4 illustrates a diaphragm assembly 53 used to vacuum-form a mouthpiece blank around a dental-arch model. The diaphragm assembly includes a mounting collar or ring 54, and a flexible, resilient diaphragm 55 is positioned in drumhead fashion across one end of the ring. The diaphragm is preferably formed from a material such as latex which provides good sealing action when the diaphragm assembly is placed against the baseplate. The diaphragm is secured to ring 54 by an elastic O-ring 56 which is stretched over the diaphragm to seat in an annular groove 57 (see FIG. 8) around the periphery of the ring.

FIG. 5 shows a mouthpiece blank 60 formed from a thermoformable plastic material. The blank is generally U-shaped to match the average curvature of the dental arch, and has a concave upper surface 61 and a convex lower surface 62. Such mouthpiece blanks are commercially available, and are typically formed from a thermoplastic vinyl resin such as the resin sold under the trademark "Elvax."

A preliminary step in fabricating an anatomically contoured dental mouthpiece in accordance with the invention is to cast a pair of "stone" models of the entire dental arch in the upper and lower jaws of the patient. These models are made by conventional dental techniques, including taking an exact impression of each dental arch, and using these impressions to cast a lower-jaw or mandibular dental-arch model 70 and an upper-jaw or maxillary dental-arch model 71 as shown in FIG. 7. Each model includes a set of replica teeth 73 and gums 74, and a base portion 76 with a flat undersurface 77.

The technique of casting such models is well known, and involves pouring a quantity of plaster or other gypsum-product material in a moldable state into the impressions taken from the patient to form replica teeth 73 and gums 74. When hardened, these castings are removed from the impressions, and base portion 76 is added by seating each casting in soft plaster held in a base-former mold (not shown).

Preferably, the conventional base-former mold is modified slightly to form undersurface 77 of the base portion of the model to include three triangularly spaced index depressions 80 and a set of vent channels 81 as shown in FIG. 6. This is readily accomplished by cementing small raised portions in the base-former mold to provide the vent channels and index depressions. The triangular spacing of the index depressions corresponds to the spacing of index buttons 19 on baseplate 12 of the articulator, and the vent channels radiate outwardly toward the sides of the model from the center of the model undersurface. The center juncture of the vent channels is positioned by the index depressions to be above evacuation hole 15 when the model is placed on the baseplate.

After the models have been cast, upper-jaw model 71 is placed on the baseplate as shown in FIG. 7, with index depressions 80 fitting snugly over index buttons 19. A "wax bite" 85 is then placed over the teeth of model 71. The wax bite may be formed at the same time the dental-arch impressions are taken from the patient, and is made by having the patient bite gently on a sheet of initially flat, formable wax. The occlusal relationship of the teeth in the upper and lower dental arches of the patient is thus transferred to the wax bite. The wax bite serves to position the stone models on the articulator in the same relationship as the patient's own teeth.

As shown in FIG. 7 wax bite 85 is positioned over teeth 73 in upper-jaw model 71 whereby it assumes the same relationship to these teeth that it had in the mouth of the patient. Lower-jaw model 70 is then placed on top of the wax bite, and positioned gently until the replica teeth on this model drop into the corresponding depressions in the wax bite. At this point, the two models are in precise alignment, the occlusal relationship of the patient's teeth being exactly duplicated in the models by positioning them against the wax bite. A quantity of soft, moldable plaster 87 is then placed on top of model 70.

With the models thus positioned on the baseplate, mounting plate 46 is secured to body portion 29 of the articulator bracket by threading clamp screw 30 into hole 47, with indexing notch 48 of the mounting plate positioned over index pin 31. The articulator bracket is then hinged downwardly into the position shown in FIG. 7, forcing the mounting plate into the soft plaster which has been placed on top of model 70. Spacing rod 34 is threaded into hole 41 of the baseplate, drawing shoulder 43 snugly against the upper surface of the baseplate.

Plaster 87 on top of model 70 flows into apertures 49 in the mounting plate, fully occupying the space defined by sloping walls 50 of the mounting plate, the undersurface of the bracket body, and undersurface 77 of model 70. Any surplus plaster is wiped away, and the assembled models are left in the position shown in FIG. 7 until the plaster has set.

When the plaster which secures mounting plate 46 and model 70 together has thoroughly hardened to lock in apertures 49, the articulator bracket is hinged backwardly to separate the models, and wax bite 85 is removed from model 71. The next step is to form thermoplastic blank 60 against the replica teeth and gums of model 71. The blank is first placed in warm water for a few minutes until it softens sufficiently to be moldable. The warmed blank is then placed over the teeth and gums of the lower model, and vacuum line 17 is connected to a vacuum source such as a conventional vacuum pump (not shown).

Diaphragm assembly 53 is next lowered over the assembled blank and model in the position shown in FIG. 8, the undersurface of ring 54 forcing the diaphragm firmly against the baseplate. Air enclosed in the region between the baseplate and diaphragm is evacuated through the vacuum line, drawing the diaphragm snugly against the blank which is in turn forced against the teeth and gums of the model. Rapid evacuation of the region under the diaphragm is assured by vent channels 81 which provide a free path for air to flow from around the model into the vacuum line.

The diaphragm forces the warmed blank into intimate contact with the model, and this forming action may be made even more complete by manually kneading the blank against the model through the diaphragm. The vacuum under the diaphragm is then broken by gently lifting one edge of diaphragm assembly 53 away from the baseplate, and the diaphragm assembly is removed.

Alternatively, the diaphragm may be left in place over the blank and model 71 during the forming of the blank on model 70 as next described.

The articulator bracket is next hinged forwardly and downwardly to force the teeth of model 70 into the still-warm, soft blank. Spacing rod 34 is again threaded into hole 41 until shoulder 43 firmly abuts the top surface of the baseplate, whereby the two models are placed in the exact relationship occupied during their original positioning on the wax bite.

The occlusal surfaces of the teeth of model 70 form corresponding indentations in the convex surface of the blank, and the blank may be manually kneaded around and over the model to a desired form. The "open" construction of the articulator bracket provides free access to the blank and model for this manual kneading. Preferably, the blank is formed so about one-third to one-half the length of the teeth in model 70 are received in the indentations. The blank is now fully formed to mate with the contour of the teeth in both models as they are positioned in the desired occlusal relationship.

The molded blank is allowed to cool, and is removed from the models as a finished mouthpiece 90 as shown in FIG. 10. Any desired trimming, smoothing, or other finishing may be done at this time. No further fitting is required, as the model is now formed in an anatomically contoured mouthpiece which will fit comfortably and precisely in the patient's mouth. The convex surface of the mouthpiece includes a row of sockets or indentations 91 as formed on model 70 to partially receive the teeth of the wearer's lower jaw 92 as seen in FIG. 11. The concave surface of the mouthpiece includes a row of sockets or indentations 93 as formed on model 71 to fit over the teeth and gums on the wearer's upper jaw 95.

A particular advantage of the finished mouthpiece is that it fits snugly and securely on the upper jaw of the wearer encasing the teeth and presenting minimum interference with normal breathing and speaking. Furthermore, the occlusal relationship of the two dental arches has been precisely reproduced by positioning the models with the wax bite, whereby the mouthpiece meshes comfortably over the teeth when the lower jaw is in a relaxed, closed position.

Duplicates of the mouthpiece may be produced at any time as the models may be exactly repositioned in the articulator. Model 71 is indexed by buttons 19 and depressions 80, and model 70 is indexed by hole 47 and notch 48 of the mounting plate which is left permanently secured to model 70.

While the invention has been described in terms of a mouthpiece with a concave side fitting over the teeth and gums of the upper jaw and having a convex side with indentations or sockets for the teeth of the lower jaw, it is to be understood that the position of the models in the articulator can be reversed to produce a mouthpiece with a concave side fitting over the teeth of the lower jaw. That is, lower-jaw model 70 can be placed against the baseplate, and upper-jaw model 71 positioned on the articulator bracket to form a mouthpiece fitting over and around the teeth and gums of the lower jaw.

We claim:

1. Apparatus for forming a moldable plastic blank into an anatomically contoured dental mouthpiece on a pair of first and second dental-arch models of a patient, comprising a baseplate for mounting the first model, a bracket secured to the baseplate and adapted to be secured to the second model when the first and second models are positioned to reproduce a specific inter-arch relationship of the patient, the bracket being movable toward and away from the first model whereby the models may be separated and subsequently moved together to reproduce the inter-arch relationship; a flexible diaphragm positionable against the baseplate and over the blank and first model, and a vacuum line in communication with a region surrounding the blank and first model, the region being enclosed by the baseplate and diaphragm, whereby evacuation of the region through the line draws the diaphragm tightly against the blank and first model, and the blank is thereby forced into intimate contact with the first model to mold the blank into a corresponding shape.

2. Apparatus for forming a moldable plastic blank into an anatomically contoured dental mouthpiece on a pair of first and second dental-arch models of a patient, comprising a baseplate for mounting the first model, a bracket having an end pivotally secured to the baseplate whereby the bracket hinges about an axis parallel to the baseplate surface, the bracket extending upwardly from the baseplate and having a body spaced from the end which extends over the first model when it is mounted on the baseplate, the bracket body being adapted to be secured to the second model when the first and second models are positioned to reproduce a specific inter-arch relationship of the patient, the bracket being movable toward and away from the first model whereby the models may be separated and subsequently moved together to reproduce the inter-arch relationship; and molding means for forcing the blank into intimate contact with the first model to mold the blank into a corresponding shape.

3. The apparatus defined in claim 2 in which the bracket includes a spacing rod extending between the bracket body and the baseplate whereby the bracket body may be reproducibly positioned at a specific height above the second model.

4. The apparatus defined in claim 3 and further comprising a mounting plate releasably secured to the bracket and adapted to be permanently secured to the second model when the first and second models are positioned to reproduce the specific inter-arch relationship of the patient.

5. The apparatus defined in claim 4 and further comprising positioning means on the baseplate and bracket body for indexing the first and second models whereby the models may be removed from and subsequently reinstalled on the apparatus to reproduce the specific inter-arch relationship of the patient without adjustment.

6. A method of forming a thermoplastic blank into an anatomically contoured dental mouthpiece on a pair of first and second dental-arch models of a patient, comprising the steps of:
  (a) aligning the models with a wax bite to reproduce a specific inter-arch relationship of the patient;
  (b) securing the aligned models in an articulator whereby the models may be separated and subsequently realigned without adjustment;
  (c) warming the thermoplastic blank to a moldable condition;
  (d) vacuum forming the warmed blank into intimate contact with the first model;
  (e) forcing the second model into the aligned position while the warmed blank is in position on the first model, whereby the blank is between and in intimate contact with both models and thereby formed into an anatomically contoured mouthpiece;
  (f) allowing the blank to cool; and
  (g) separating the models whereby the formed mouthpiece may be removed from the models.

7. The apparatus defined in claim 3 in which the molding means comprises a flexible diaphragm positionable against the baseplate and over the blank and first model, and a vacuum line in communication with a region surrounding the blank and first model, the region being enclosed by the baseplate and diaphragm, whereby evacuation of the region through the line draws the diaphragm tightly against the blank and first model.

References Cited
UNITED STATES PATENTS

| | | | |
|---|---|---|---|
| 2,775,036 | 12/1956 | Kesling | 32—14 |
| 3,178,820 | 4/1965 | Kesling | 32—14 |
| 3,343,264 | 9/1967 | Guichet | 32—32 |

ADELE M. EAGER, *Primary Examiner.*

U.S. Cl. X.R.

128—136